A. L. McGREGOR.
AUTOMOBILE BUMPER.
APPLICATION FILED JAN. 17, 1921.

1,372,156.

Patented Mar. 22, 1921.

Inventor.
Allan L. McGregor.

By:

UNITED STATES PATENT OFFICE.

ALLAN L. McGREGOR, OF CHICAGO, ILLINOIS.

AUTOMOBILE-BUMPER.

1,372,156.

Specification of Letters Patent.  Patented Mar. 22, 1921.

Application filed January 17, 1921. Serial No. 437,736.

*To all whom it may concern:*

Be it known that I, ALLAN L. McGREGOR, a citizen of the United States, and a resident of Chicago, in the county of Cook, and State of Illinois, have invented certain new and useful Improvements in Automobile-Bumpers, of which the following is a specification.

This invention relates to improvements in automobile bumpers, and more particularly to bumpers made up of resilient bars arranged so as to be yieldable in a horizontal direction, and relatively non-yieldable in a vertical direction. The type of bumper to which the present invention pertains is further characterized by the use of two or more resilient bars extending the full length of the bumper, in parallel and vertically spaced relation with each other, the ends of these bars being bent rearwardly and inwardly and terminating beyond the points of attachment of the bumper with the vehicle frame. The object of the invention is to provide a practical construction for a bumper based upon the general features hereinbefore set forth.

A preferred type of construction is illustrated in the accompanying drawings, in which—

Figure 1:
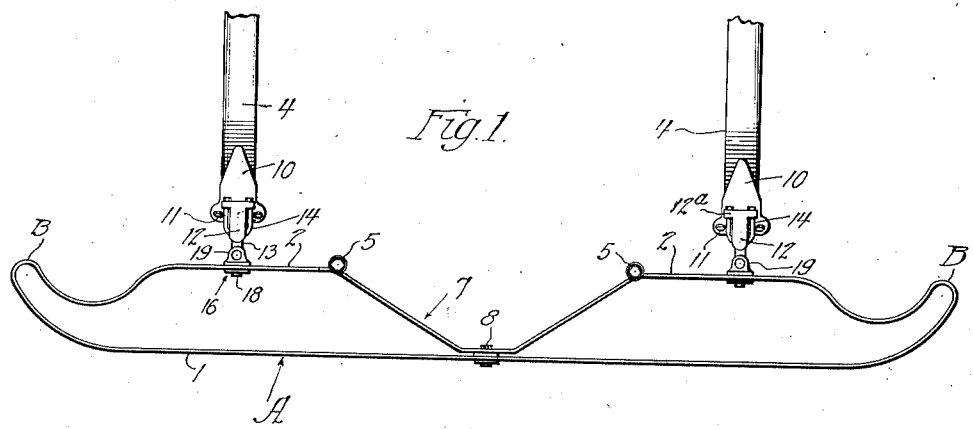
Figure 2:
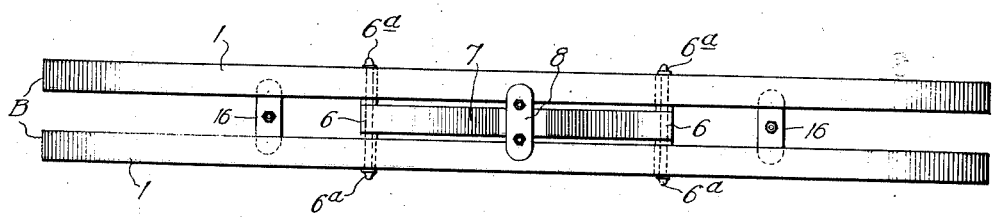
Figure 3:
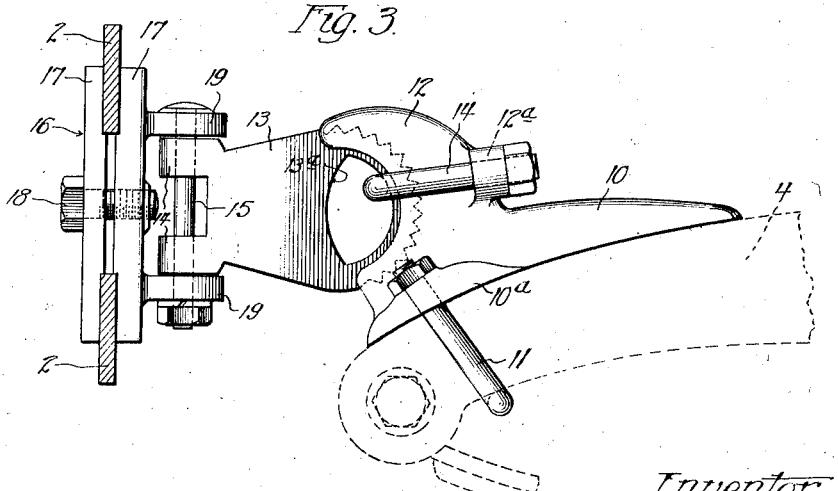

Figure 1 is a top plan view of the bumper attached to the forward end of a motor vehicle, Fig. 2 is a view in front elevation of the bumper, and Fig. 3 is an enlarged detailed view showing the type of attaching member especially designed for this particular bumper.

This bumper embodies the common arrangement of parts; namely, an impact section A extending throughout the length of the bumper, this portion being straight throughout the central portion thereof, curving rearwardly at the ends, thus forming the end sections B—B. In this particular bumper the impact section A and end sections B—B consist of two resilient bars 1—1 arranged in paralled relation, and spaced apart vertically a distance substantially equal to the width of one of the bars. These bars are shaped in exactly the same form, each extending throughout the impact section A, curving rearwardly as it approaches the ends of the bumper, where it is bent in U-form with a slight curvature in a forward direction, and terminating in straight end portions 2—2 extending parallel to the impact section A, and terminating some distance inwardly from the points of attachment with attaching brackets 3—3, and secured to the forward ends of the longitudinal members 4—4 of a motor vehicle. As clearly disclosed in Fig. 1, the attaching brackets 3—3 engage the straight end portions 2—2 of both bars 1—1, there being used for this purpose an especially designed bracket or fitting such as shown in Fig. 3, and which will hereinafter be described more in detail.

As already suggested, the free end portions 2—2 of the bars 1—1 extend parallel to the impact section A, and immediately to the rear thereof. Furthermore, they terminate inwardly and beyond the points of attachment with the brackets 3—3, there being a space immediately behind the central portion of the impact section A separating the ends of the bars 1—1. In order to fix these otherwise free ends, the following construction is resorted to: The extremities of the bars 1—1 are bent to form eyes 5—5 adapted to have pins 6—6 inserted through the vertically alined eyes at either end of the bars 1—1, these pins being in the nature of hinge pins, such as are employed in the ordinary door hinge. The ends of the pins are provided with removable heads 6ª—6ª, thus permitting the pins to be withdrawn, if desired. The pins thus inserted through the ends of the bars 1—1 serve to tie them together, and in addition, act as connections for the ends of a V-shaped reinforcing bar 7, which has eyes formed at its ends through which the pins 6—6 pass in the same manner as they pass through the eyes 5—5 of the bars 1—1. Furthermore, the ends of the V-shaped bar 7 engage the pins 6—6 intermediate the ends of the bars 1—1, and as a result the entire bar occupies a position within the vertical space separating the two bars 1—1, as clearly shown in Fig. 2. The reinforcing bar is further proportioned so that its apex is positioned in the vertical plane of the impact section A, and within the space between the bars 1—1. At this point, a connecting member 8 is utilized, the same comprising a pair of plates which are clamped against the opposite faces of the bars 1—1, as well as the apex of the bar 7, by means of bolts. In this manner the extremities of the bars 1—1 are securely tied together, and more or less stabilized by direct connection with the central portion of the impact section A through the medium of the converging portions of the bar 7, and by the same means are indirectly connected with each other. Thus it is manifest that a more rigid structure is produced, and one which is capable of resisting the shocks of impact without permanent distortion of the bars.

Although any suitable type of attaching bracket may be employed, the one disclosed in Fig. 3 is especially adaptable for this particular type of bumper. This bracket comprises a base plate 10, having laterally extending ears 10ª through which extend the ends of a U-bolt 11 surrounding the frame member 4 immediately adjacent its end. Integral with the base plate 10 is a vertically disposed sector 12 having a forwardly facing depression within which is mounted a horizontal stub arm 13 having a curved rear edge conforming to the curvature of the depression in the sector 12. As a preferable construction, the co-acting surfaces of the sector and the stub arm 13 are serrated or notched so as to prevent relative movement therebetween, and the parts adjustably secured together by means of a horizontal U-bolt 14 extending forwardly through lugs 12ª formed integral with the sector 12, and passing through an opening 13ª formed in the stub arm 13. The forward end of the stub arm terminates in a vertically disposed yoke 14 adapted to receive a bolt 15, said bolt serving as a pivotal connection between the stub arm and the clamping member 16 having direct connection with the rear portions 2—2 of the parallel bars 1—1. The clamping member is of a simple construction, comprising two vertically arranged plates 17—17 adapted to engage the bars 1—1, securely clamping them in position by means of a bolt 18 passing through the plates 17—17. Integral with the rearmost plate are two lugs or ears 19—19 spaced apart vertically so as to embrace the outer end of the stub arm between them, and having pivotal connection with the bolt 15. This type of connection provides for vertical adjustment of the bumper in order to assure its horizontal position, as well as free swinging movement in a horizontal plane at the points of attachment with the vehicle, in this way permitting the bars to yield freely under the force of blows received against the impact section.

Having described a preferred form of bumper, I claim as my invention:

1. In a bumper, the combination of a plurality of vertically offset bars extending throughout the length of the bumper, and bent rearwardly and inwardly at their ends, and a reinforcing member connecting the free ends of said bars with their central portions.

2. In a bumper, the combination of a plurality of bars spaced apart vertically, each of said bars extending throughout the length of the bumper, and bent rearwardly and inwardly at the ends thereof, means connecting the adjacent free ends of said bars, and reinforcing members extending from the connected free ends of said bars toward the impact member, and connected at the central portion thereof.

3. In a bumper, the combination of a pair of vertically spaced resilient bars extending longitudinally of the bumper and forming the impact member thereof, the end portions of said bars being bent rearwardly and inwardly for attachment to the vehicle frame members short of the free ends, transverse members connecting the free ends of said bars, and a U-shaped bar connected at its ends with said free ends and at its apex with said pairs of bars intermediate the ends of the impact member.

4. In a bumper, the combination of a pair of vertically spaced resilient bars extending longitudinally to form the impact member, the end portions of said bars being bent rearwardly and inwardly for attachment to the vehicle frame members short of the free ends, pins connecting the free ends of said bars, and a single U-shaped bar pivotally connected at its ends with said pins, and at its apex between said bars at the central point of the impact member.

5. In a bumper, the combination of a pair of resilient bars spaced apart vertically, each of said bars extending throughout the length of the bumper, and having their end portions bent rearwardly and inwardly in U-shape to form the ends of the bumper, the free ends of said bars terminating inwardly beyond the points of connection with the vehicle frame members, and a reinforcing bar connected with the free ends of said bars and bent forwardly toward and connected with said bars intermediate the end portions of the bumper.

6. In a bumper, the combination of a pair of resilient bars spaced apart vertically, and extending throughout the length of the bumper, the end portions thereof being bent rearwardly and inwardly to form U-shaped end sections, the rearwardly disposed portions thereof terminating beyond the points of connection with the vehicle frame members, transverse pins mounted in eyes formed at the free ends of said bars, and a U-shaped bar having pivotal connection at its ends with said pins, and fixed connection at its apex with said parallel bars at the central portion of the bumper.

In witness whereof, I hereunto subscribe my name this 11th day of January, A. D. 1921.

ALLAN L. McGREGOR.